United States Patent [19]

Stockinger et al.

[11] Patent Number: 4,611,041

[45] Date of Patent: Sep. 9, 1986

[54] POLYMERS DERIVED FROM N-CYANOACYLAMIDES

[75] Inventors: Friedrich Stockinger, Hölstein; Friedrich Lohse, Oberwil; Roland Moser, Basel, all of Switzerland

[73] Assignee: Ciba-Geigy Corporation, Arsdley, N.Y.

[21] Appl. No.: 725,866

[22] Filed: Apr. 22, 1985

Related U.S. Application Data

[62] Division of Ser. No. 466,458, Feb. 15, 1983, Pat. No. 4,529,821.

[30] Foreign Application Priority Data

Feb. 23, 1982 [CH] Switzerland ............... 1104/82

[51] Int. Cl.⁴ ............... C08F 20/42; C08F 120/42; C08F 220/42
[52] U.S. Cl. ............................................... 526/298
[58] Field of Search ............... 526/298, 292.9, 293, 526/271; 564/105

[56] References Cited

U.S. PATENT DOCUMENTS 4,529,821 7/1985 Stockinger et al. ............... 564/105

Primary Examiner—Joseph L. Schofer
Assistant Examiner—Peter F. Kulkosky
Attorney, Agent, or Firm—Luther A. R. Hall

[57] ABSTRACT

N-Cyanoacylamide compounds of the formula I

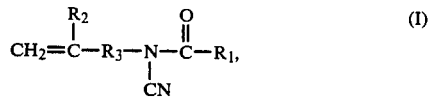

wherein $R_1$ is hydrogen, alkyl, cycloalkyl or aryl, $R_2$ is hydrogen or alkyl and $R_3$ is alkylene or arylenealkylene, are prepared by reacting 1 mol of an N-cyanocarboxylic acid amide salt with 1 mol of a halogen compound in a polar, aprotic solvent.

The N-cyanoacylamide compounds of the formula I can be used for hardening epoxide resins, for the preparation of isomelamine or for the preparation of linear polymers which can be crosslinked by heat.

6 Claims, No Drawings

POLYMERS DERIVED FROM N-CYANOACYLAMIDES

This is a divisional of application Ser. No. 466,458, filed on Feb. 15, 1983, now U.S. Pat. No. 4,529,821, issued July 16, 1985.

The present invention relates to novel N-cyanoacylamide compounds, a process for their preparation and their use.

Bifunctional compounds, i.e. compounds having two functional and reactive groups, differing from one another, in the molecule are of particular interest for applications in which B-stage resins are required, for example for the preparation of prepregs or composite materials. Bifunctional compounds containing, for example, a polymerisable double bond and a glycidyl group or a reactive N-heterocyclic group in the molecule are known from British Patent Specification No. 1,405,539 and from German Offenlegungsschrift No. 2,334,826. The linear polymers which are obtained from such monomers by polymerisation of the double bond and which contain several glycidyl groups or reactive N-heterocyclic groups in the molecule can only be converted into a thermosetting state by means of an additional curing agent and/or crosslinking agent.

The object of the present invention was, therefore, to provide novel bifunctional compounds which can be converted to thermosetting resins without problems in two-stage conversion reactions and which thus have further possible uses, for example are also suitable for the preparation of prepregs and composite materials.

It has now been found that certain N-cyanoacylamide compounds containing a polymerisable double bond and a heat-crosslinkable cyanoamide group in the molecule meet these requirements.

The present invention relates, therefore, to N-cyanoacylamide compounds of the formula I

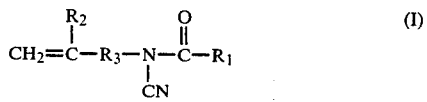

in which $R_1$ is a hydrogen atom, alkyl having 1–20 C atoms, cycloalkyl having 5–8 C atoms or aryl having 6 or 10 ring C atoms, $R_2$ is a hydrogen atom or alkyl having 1–4 C atoms and $R_3$ is an alkylene or arylenealkylene group having not more than 12 C atoms, or, if $R_2$ is a hydrogen atom, $R_3$ is also an oxyalkylene group having not more than 12 C atoms.

The alkyl group $R_1$ can be linear or branched, unsubstituted or substituted or interrupted by ether oxygen atoms. Examples of suitable substituents are the nitrile group and the nitro group. The cycloalkyl group $R_1$ can, if appropriate, also be substituted by substituents of this type. The following may be mentioned as examples of such alkyl groups: methyl, cyanomethyl, ethyl, n-propyl, isopropyl, n-butyl, sec.-butyl, n-pentyl, 2-pentyl, n-hexyl, n-heptyl, 3-heptyl, n-octyl and n-dodecyl.

The aryl group $R_1$ can be unsubstituted or substituted, for example by 1 or 2 halogen atoms, particularly chlorine or bromine, 1 or 2 nitro groups or 1 or 2 alkyl or alkoxy groups having 1–4, in particular 1 or 2, C atoms. The following may be mentioned as examples of aryl groups of this type: phenyl, p-nitrophenyl, 3,5-dinitrophenyl, p-tolyl, o-tolyl, 4-chloro-1-nitrophenyl, 2-methoxyphenyl, naphthyl and β-chloronaphthyl.

The radical $R_3$ is, for the most part, a linear, unsubstituted radical, for example methylene, ethylene, oxyethylene, butylene or phenylenemethylene.

In the formula I $R_1$ is preferably -H, $CH_3(CH_2)_n$, n=0—6,

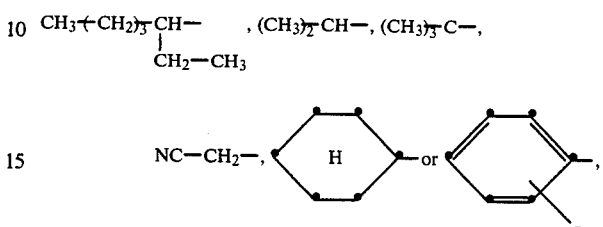

in which $R_4$ is $-H$, $-CH_3$, $-C_2H_5$, $-Cl$, $-Br$, $-NO_2$ or $-OCH_3$ and $R_3$ is $-CH_2-$, or $+O+CH_2+_m+_p$, m and p=1—6, p being preferably 1 or 2, or $R_3$ is

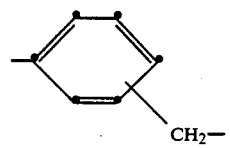

The compounds of the formula I can be prepared by reacting 1 mol of an N-cyanocarboxylic acid amide salt of the formula II

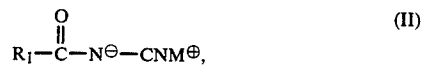

in which $M^\oplus$ a sodium or potassium cation, with 1 mol of a halogen compound of the formula III

in which X is a chlorine, bromine or iodine atom, in a polar, aprotic solvent.

The compounds of the formula II and III are known compounds. Examples of compounds of the formula II which may be mentioned are the potassium salts and, in particular, the sodium salts of acetylcyanamide, benzoylcyanamide and N-cyanocyclohexylcarboxylic acid amide.

Examples of suitable compounds of the formula III are allyl chloride, allyl bromide, methallyl chloride, β-chloroethyl vinyl ether and vinylbenzyl chloride.

Examples of suitable polar, aprotic solvents are dimethylformamide, dimethylacetamide, dimethylpropionamide, N-methylpyrrolidone, dimethylsulfoxide, sulfolane, hexamethylphosphoric acid triamide, tetramethylurea or the compound to be synthesised.

The quantity of the polar, aprotic solvent to be employed in the process for the preparation of the compounds of the formula I is not critical. In general, the solvent is used in such quantities that the starting compound of the formula II is in the form of a 5–70% strength solution, preferably a 10–50% strength solution.

The process can be carried out within a wide temperature range from about 20° to 180° C. The preferred reaction temperature is between 40° and 120° C.

The N-cyanoacylamide compounds according to the invention have many possible uses. Thus, for example, they can be employed as starting materials for the preparation of isomelamines, as hardeners for epoxide resins and for the preparation of linear homopolymers and copolymers which are heat-crosslinkable.

In the preparation of isomelamines from the compounds according to the invention, N-alkylcyanamides which can be trimerised to form trialkylisomelamines are formed by hydrolysing or alcoholising the compounds of the formula I.

Furthermore, it has been found that the N-cyanoacylamide compounds according to the invention are also valuable hardeners for epoxide resins.

The present invention also relates, therefore, to the use of the compounds according to the invention in hardenable mixtures consisting of epoxide resins and the N-cyanoacylamide compounds.

The quantity of the N-cyanoacylamide compounds employed as hardeners in these hardenable mixtures is calculated such that normally there are 0.75 to 1.25 equivalents of N-cyanocarboxylic acid amide group to 1 epoxide equivalent. It is preferable to use the N-cyanoacylamide compounds and the epoxide resin component in equivalent quantities.

The N-cyanoacylamide compounds according to the invention can be converted by conventional polymerisation into linear polymers, on their own or together with other polymerisable monomers. Suitable monomers which can be added to the compounds according to the invention are compounds of the acrylic acid series, for example esters formed from acrylic acid or methacrylic acid and alcohols or phenols, for example methyl acrylate, butyl acrylate, methyl methacrylate, acrylonitrile, methacrylonitrile and ethylene glycol dimethacrylate, as well as other reactive, olefinically unsaturated monomers, for example styrene, divinylbenzene, vinyl acetate, maleic anhydride and the half-esters and diesters of maleic acid, for example dimethyl or dibutyl maleate. Preferred monomers are the hydroxyalkyl esters of (meth)acrylic acid, for example 2-hydroxyethyl acrylate, 2-hydroxyethyl methacrylate and 2-hydroxypropyl (meth)acrylate.

The customary catalysts which form free radicals are preferably used for the polymerisation or copolymerisation; examples which may be mentioned are hydrazine derivatives, such as hydrazine hydrochloride, organometallic compounds, such as tetraethyl lead, and also, in particular, aliphatic azo compounds, such as α, α'-azoisobutyrodinitrile and organic peroxides or per-salts, for example peracetic acid, acetyl peroxide, chloroacetyl peroxide, benzoyl peroxide, chlorobenzoyl peroxide, benzoylacetyl peroxide and tert.-butyl hydroperoxide, and also inorganic peroxide compounds, such as sodium peroxide, alkali metal percarbonates, alkali metal persulfates or alkali metal perborates, and also hydrogen peroxide, which can advantageously replace the more expensive benzoyl peroxide. The quantity thereof added is adjusted in a known manner, depending on the desired progress of the reaction or the desired properties of the polymer; it is advantageous to employ about 0.05 to 10 per cent by weight of the catalyst, calculated on the total weight of the mixture of monomers, and the total quantity of catalyst is added either at the start of the polymerisation or in portions during the course of the polymerisation.

In certain cases, in particular in homopolymerisation, ionic catalysts, for example a Lewis acid, should be employed. The customary polymerisation conditions in respect of temperature and medium (solvent or absence of solvent) can be used in the polymerisation or copolymerisation.

The N-cyanoacylamide compounds according to the invention or mixtures thereof with other polymerisable monomers can be used for protecting surfaces, as impregnating resins and casting resins and, in particular, for the preparation of B-stage resins and composite materials.

It is also possible to add customary modifying agents, such as extenders, fillers and reinforcing agents, pigments, dyes, organic solvents, plasticisers, flow control agents, thixotropic agents, flame-retarding substances and mould release agents, to the N-cyanoacylamide compounds according to the invention or mixtures thereof with other polymerisable monomers or epoxide resins, before crosslinking or hardening, in any stage.

The following examples illustrate the invention in greater detail without limiting it.

EXAMPLE 1

N-Cyano-N- β-methallylacetamide 53.0 g (0.5 mol) of the sodium salt of acetylcyanamide and 49.8 g (0.5 mol +10% excess) of β-methallyl chloride in 100 ml of dimethylformamide are reacted for 2 hours and 25 minutes at 124°-130° C. in a glass apparatus equipped with a stirrer, a thermometer, a reflux condenser and a drying tube. The reaction mixture is then filtered with suction, the filtrate is concentrated in vacuo at 70° C. on a rotary evaporator and the residue is purified by fractional distillation. This gives 46.8 g (67.7% of theory) of a colourless, clear liquid, boiling at 87° C./23.4 mbar.

| Elementary analysis: | |
|---|---|
| calculated | found |
| 60.85% C | 60.66% C |
| 7.30% H | 7.46% H. |
| 20.28% N | 20.03% N |

The H-NMR spectral data are in agreement with the following structural formula:

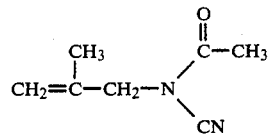

EXAMPLE 2

N-Cyano-N-vinylbenzylacetamide 23.3 g (0.2 mol +10% excess) of the sodium salt of acetylcyanamide and 30.5 g (0.2 mol) of vinylbenzyl chloride (technical mixture of isomers containing approx. 40% of the para-component and 60% of the meta-component) are reacted in 100 ml of dimethylformamide for 8 hours at 48°-50° C., when the reaction is complete the mixture is filtered with suction, the filtrate is introduced into 300 g of ice and 500 ml of water while stirring vigorously and the mixture is then extracted with ethyl acetate. The ethyl acetate solution is dried with anhydrous sodium sulfate and filtered with suction, the filtrate is decolourised with active charcoal, the solution is filtered and the filtrate is concentrated in vacuo at 40° C. on a rotary evaporator. The residue is dried to constant weight at 40° C./0.13 mbar. This gives 34.9 g (87.1% of theory) of a brownish, viscous liquid, which is purified by bulb tube distillation at 130°–145° C./0.7 mbar.

| Elementary analysis: | |
|---|---|
| calculated | found |
| 71.98% C | 71.83% C |
| 6.04% H | 6.31% H |
| 13.99% N | 13.87% N |

The H-NMR spectral data are in agreement with the following structural formula:

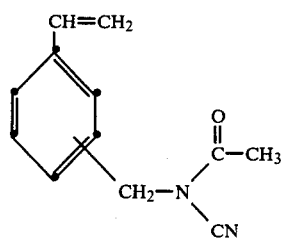

EXAMPLE 3

N-Cyano-N-allylacetamide 159.1 g (1.5 mols) of the sodium salt of acetylcyanamide and 137.8 g (1.5 mols +20% excess) of allyl chloride are reacted in 400 ml of sulfolane for 9 hours and 45 minutes at 70°–127° C. analogously to Example 1, and the mixture is worked up in accordance with Example 1. This gives 121.7 g (65.4% of theory) of a colourless distillate, boiling at 98° C./43 mbar.

| Elementary analysis: | |
|---|---|
| calculated | found |
| 58.06% C | 58.09% C |
| 6.50% H | 6.57% H |
| 22.57% N | 22.56% N |

The H-NMR spectral data are in agreement with the following structural formula:

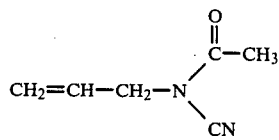

EXAMPLE 4

N-Cyano-N-2-vinyloxyethylacetamide 106.1 g (1.0 mol) of the sodium salt of acetylcyanamide, 117.2 g (1.1 mols) of 2-chloroethyl vinyl ether and 8.3 g (50 mmols) of potassium iodide are reacted in 400 ml of dimethylformamide for 1 hour and 5 minutes at 76°–127° C. in accordance with Example 2, and the mixture is worked up analogously to Example 1. Fractional distillation of the crude product gives 69.0 g (44.7% of theory) of a clear, colourless distillate, boiling at 128° C./29 mbar.

| Elementary analysis: | |
|---|---|
| calculated | found |
| 54.54% C | 54.45% C |
| 6.54% H | 6.65% H |
| 18.17% N | 17.92% N |

The ¹H-NMR spectrum is in agreement with the following structure:

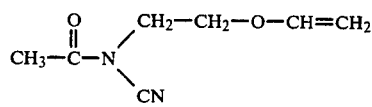

In the Use Examples I–VI which follow, the N-cyano-N-vinylbenzylacetamide prepared in accordance with Example 2 is used as the monomer for the preparation of polymers and as a hardener for epoxide resins. The reactivity of N-cyano-N-vinylbenzylacetamide is determined on its own and mixed with a catalyst or with an epoxide resin on the basis of gelling time and by means of thermal analysis. The glass transition temperature and the tensile shear strength are used to characterise the crosslinked polymers.

The gelling time is measured at various temperatures. This is effected by placing a small quantity of the substance to be tested on the centre of a hotplate (also known as a plate for determining the time required to reach the B-stage) which is adjusted to the desired temperature, and the time for gelling of the sample is determined.

For determining reactivity by means of differential thermal analysis (DTA), approx. 20 mg of the substance to be tested are weighed out into an aluminium crucible which is specially suitable for this purpose. This crucible is heated at a heating rate of 4° C./minute in the measuring chamber of a TA 2000 DTA instrument made by Mettler-Instrumente AG, CH-Greifensee, and the temperature difference, compared with an empty crucible heated at the same time is recorded continuously. The temperatures for the start of the reaction ($T_S$), for the maximum reaction rate ($T_{RRmax}$) and for the end of the reaction (TE) are read off from the curve thus obtained. The enthalpy of the reaction is calculated from the area between the curve obtained and the base line.

The glass transition temperature is determined by pouring 4 g of each of the substances to be tested into a thin-walled aluminium crucible of diameter about 5 cm, and hardening the samples therein. A sample of the crosslinked polymer is taken from the disc thus obtained, and the glass transition point is determined on this sample by means of differential thermal analysis (DTA). The specific heat undergoes a change at the transition point; this change is registered as a transition point in the curve recorded by the TA-2000 DTA instrument made by Mettler-Instrumente AG, CH-Greifensee. The glass transition temperature (GTT) enables conclusions to be drawn regarding the heat distortion point of the resulting polymers.

mixed into 100 parts of CVBA. As can be seen from Table 1, the moulded material obtained after hardening at 120° C. has a GTT of 87° C. and a tensile shear strength of 3.4 N/mm². Further hardening at 180° C. raises the GTT by 8° C. and the tensile shear strength by 50%.

TABLE 1

| Use example | I | | II | | III | |
|---|---|---|---|---|---|---|
| Substance | CVBA as such | | 100 parts of CVBA 1 part of tert.-butyl peroxypivalate | | 100 parts of CVBA 1 part of tert.-butyl peroxypivalate 2 parts of 4% Co octoate | |
| Gelling time at 180° C. | 40" | | 17" | | 15" | |
| (' = minutes at 160° C. | 2'20" | | 35" | | 25" | |
| " = seconds) at 140° C. | 3'50" | | 40" | | 35" | |
| Thermal analysis | | | | | | |
| $T_S$ °C. | 101 | | 54 | | 50 | |
| $T_{RRmax.}$ °C. | 160 | | 106 | | 96 | |
| $T_E$ °C. | 207 | | 196 | | 135 | |
| Enthalpy of reaction per mol (kj) | 44.6 | | 48.5 | | 51.1 | |
| Hardening (hours/°C.) | 2/80° + 6/120° | Further hardening 6/180° | 2/80° + 6/120° | Further hardening 6/180° | 2/80° + 6/120° | Further hardening 6/180° |
| Glass transition temperature (°C.) | 88 | 93 | 84 | 90 | 87 | 95 |
| Tensile shear strength (N/mm²) | 4.7 | 6.6 | 4.4 | 7.2 | 3.4 | 5.1 |

The tensile shear strength is determined by applying a small quantity of the substance to be investigated to the ends of test strips made of Anticorodal B of dimensions 170×25×2.5 mm which have previously been roughened by grinding and degreased by washing with solvent. Two of these test strips are in each case adjusted by means of a gauge so that the ends which have been coated with the substance to be tested overlap by 12 mm. The strips are fixed with a clamp until the substance employed as the adhesive has hardened in accordance with the hardening conditions. The tensile shear strength of the glued joint is then calculated as specified in DIN 53,283 (DIN =Deutsche Industrie Norm [German Industrial Standard]), taking the mean from three measurements on samples.

USE EXAMPLE I

N-Cyano-N-vinylbenzylacetamide (CVBA) can be converted into the polymeric state by means of heat alone, without the addition of a catalyst. In the course of this it is found that CVBA is reactive in the absence of additives having a catalytic action. A moulded material having a GTT of 88° C. and a tensile shear strength of 4.7 N/mm² is obtained after hardening at 120° C. Further hardening at 180° C. raises the GTT by only 5° C., but increases the tensile shear strength by 50%.

The reactivity of CVBA and the properties of the polymer are shown in Table 1.

USE EXAMPLE II

Measured in terms of gelling time and by means of thermal analysis, the addition of 1 part of tert.-butyl peroxypivalate to 100 parts of CVBA causes an increase in the reactivity. The moulded material obtained after hardening at 120° C. has a GTT of 84° C. and a tensile shear strength of 4.4 N/mm². Further hardening at 180° C. raises the GTT by only 6° C., but increases the tensile shear strength by about 65% (see also data in Table 1).

USE EXAMPLE III

1 Part of tert.-butyl peroxypivalate and 2 parts of a 4% by weight solution of Co octoate in styrene are mixed into 100 parts of CVBA. As can be seen from Table 1, the moulded material obtained after hardening at 120° C. has a GTT of 87° C. and a tensile shear strength of 3.4 N/mm². Further hardening at 180° C. raises the GTT by 8° C. and the tensile shear strength by 50%.

The hardening of epoxide resins:

CVBA is mixed into solid, unmodified bisphenol A diglycidyl ether having an epoxide content of 2.1 equivalents/kg and a softening range of about 50° C. and a viscosity of 85,000 mpa.s at 100° C. (epoxide resin I) by dissolving the hardening catalysts and accelerators in CVBA, mixing the product coarsely by hand with the finely powdered epoxide resin I and then grinding the mixture on a triple roll mill.

USE EXAMPLE IV

CVBA and epoxide resin I are mixed as described above in the ratio of 1 mol per 1 epoxide equivalent. After hardening at 140° C., a moulded material having a GTT of 88° C. and a tensile shear strength of 22.1 N/mm² is obtained. Further hardening at 180° C. causes an increase in GTT of 7° C. and an increase in the tensile shear strength of more than 30% to 29.3 N/mm².

USE EXAMPLE V 0.005 mol/epoxide equivalent of 1-methylimidazole are added, as an accelerator, to the hardenable epoxide resin mixture used in Use example IV. The moulded material obtained after hardening at 140° C. has a GTT of 85° C. and a tensile shear strength of 13.4 N/mm². Further hardening at 180° C. raises the GTT by 8° C. and increases the tensile shear strength by about 50%.

USE EXAMPLE VI

Both tert.-butyl peroxypivalate and a 4% by weight solution of Co octoate in styrene are added, as accelerators, to the hardenable epoxide resin mixture used in Use example IV. Thermal analysis indicates 2 exothermic reactions in the hardening process. The moulded material obtained after hardening at 120° C. has a GTT of 77° C. and a tensile shear strength of 15.2 N/mm². Further hardening at 180° C. increases the GTT by 13° C. and the tensile shear strength by 40% (see Table 2).

TABLE 2

| Use example | IV | V | VI | |
|---|---|---|---|---|
| Epoxide resin I | 100 parts in each case | | | |
| CVBA | 38.6 parts in each case | | | |
| Additives | — | 0.1 part of methyl-imidazole | 0.4 part of tert.-butyl peroxypivalate 0.4 part of 4% Co octoate | |
| Gelling time 180° C. (' = minutes) 160° C. (" = seconds) 140° C. | 11' 41' 52' | 4'10" 18' 24'30" | 6'30" 33' 43' | |
| Thermal analysis | | | | |
| $T_S$ °C. | 124 | 101 | 64 | 131 |
| $T_{RRmax.}$ °C. | 189 | 156 | 98 | 188 |
| $T_E$ °C. | 262 | 241 | 131 | 241 |
| Enthalpy of reaction per epoxide equivalent (kj) | 161.6 | 178.6 | 32.0 | 117.6 |
| Hardening (hours/°C.) A = 8/140 B = 8/140 + 6/180 | A | B | A | B | A | B |
| Glass transition temperature (°C.) | 88 | 95 | 85 | 93 | 77 | 90 |
| Tensile shear strength (N/mm²) | 22.1 | 29.3 | 13.4 | 20.2 | 15.2 | 21.1 |

USE EXAMPLE VII

A solution of 3.4 g (0.0607 mol) of KOH in 10 ml of H₂O is added to 7.44 g (0.06 mol) of N-cyano-N-allylacetamide. After adding 6 ml of ethanol the mixture becomes homogeneous and undergoes an exothermic reaction. After a short time, an oil separates out; this can be brought into solution by adding 3 ml of ethanol and boiling the mixture for a short time. After cooling, the mixture is diluted with 10 ml of H₂O and extracted with 3 portions of chloroform (20, 10 and 10 ml). Concentrating the extracts on a rotary evaporator gives 4.77 g of a colourless oil, which is purified by distillation in a bulb tube oven, affording 3.54 g (71.9% of theory) of 1,3,5-triallylisomelamine, which boils at 105°–115° C. at 0.026 mbar, solidifies in a crystalline state at room temperature and is over 97% pure by gas chromatography.

| Analysis: C₁₂H₁₈N₆ (M = 246.32): | | | |
|---|---|---|---|
| calculated: | C 58.52% H 7.37% N 34.12% | found: | C 58.32% H 7.34% N 34.57% |

USE EXAMPLE VIII 1.3 Parts (0.5% by weight) of dibenzoyl peroxide are added to a mixture of 154 parts (1 mol) of N-cyano-N-2-vinyloxyethylacetamide and 98 parts (1 mol) of maleic anhydride. A clear solution of very low viscosity is obtained after a few minutes. As measured by the gelling time and thermal analysis, good reactivity is observed. The moulded material obtained after hardening for 6 hours at 120° C. has a glass transition temperature of 95° C. which can be increased by 35° C. by further hardening for 6 hours at 180° C.

What is claimed is:

1. A linear homopolymer obtained by the thermal, free radical or ionic polymerization of an N-cyanoacylamide of formula I $$CH_2=C-R_3-N-C-R_1, \quad (I)$$
with $R_2$ above $C$, $O$ double-bonded to $C$, and $CN$ below $N$ in which R₁ is a hydrogen atom, alkyl having 1–20 C atoms, cycloalkyl having 5–8 C atoms or aryl having 6 or 10 ring C atoms, R₂ is a hydrogen atom or alkyl having 1–4 C atoms and R₃ is an alkylene or arylenealkylene group having not more than 12 C atoms, or, if R₂ is a hydrogen atom, R₃ is also an oxyalkylene group having not more than 12 C atoms.

2. A homopolymer according to claim 1 where in the compound of formula I

R₁ is —H, CH₃—(CH₂)ₙ—, n=0–6,

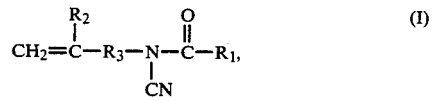

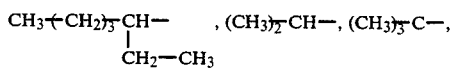

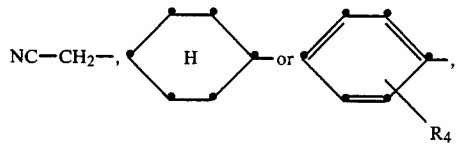

in which R₄ is —H, —CH₃, —C₂H₅, —CL, —Br, —NO₂ or —OCH₃, and R₃ is —CH₂—, or —(O—(CH₂)ₘ)ₚ—, m and p each being 1–6, or is

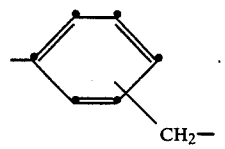

3. A homopolymer according to claim 1 wherein the compound of formula I is N-cyano-N-vinylbenzylacetamide, N-cyano-N-β-methallylacetamide, N-cyano-N-allylacetamide or N-cyano-N-2-vinyloxyethylacetamide.

4. A copolymer obtained by the free radical polymerization of an N-cyanoacylamide of formula I

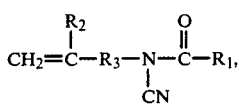
(I)

in which $R_1$ is a hydrogen atom, alkyl having 1–20 C atoms, cycloalkyl having 5–8 C atoms or aryl having 6 or 10 ring C atoms, $R_2$ is a hydrogen atom or alkyl having 1–4 C atoms and $R_3$ is an alkylene or arylenealkylene group having not more than 12 C atoms, or, if $R_2$ is a hydrogen atom, $R_3$ is also an oxyalkylene group having not more than 12 C atoms, and an ethylenically unsaturated comonomer selected from the group consistinig of the acrylate esters, the methacrylate esters, acrylonitrile, methacrylonitrile, styrene, divinylbenzene, vinyl acetate, maleic anhydride and the maleate esters and half esters.

5. A copolymer according to claim 4 where in the compound of formula I $R_1$ is —H, $CH_3$—$(CH_2)_n$—, $n=0-6$,

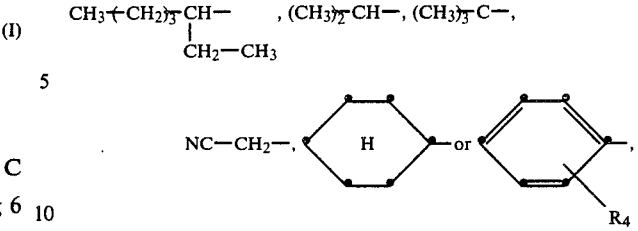

in which $R_4$ is —H, —$CH_3$, —$C_2H_5$, —CL, —Br, —$NO_2$ or —$OCH_3$, and $R_3$ is —$CH_2$—, or —$(O$—$CH_2)_m]_p$—, m and p each being 1–6, or is

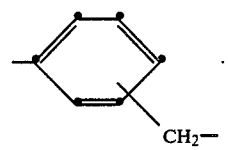

6. A copolymer according to claim 4 wherein the compound of formula I is N-cyano-N-vinylbenzylacetamide, N-cyano-N-β-methallylacetamide, N-cyano-N-allylacetamide or N-cyano-N-2-vinyloxyethylacetamide.

* * * * *